US005343228A

United States Patent [19]

Takada

[11] Patent Number: 5,343,228

[45] Date of Patent: Aug. 30, 1994

[54] SUCTION RECOVERY MECHANISM AND INK JET RECORDING APPARATUS USING SAME

[75] Inventor: Hideaki Takada, Kawasaki, Japan

[73] Assignee: Canon Kabushiki Kaisha, Tokyo, Japan

[21] Appl. No.: 769,390

[22] Filed: Oct. 1, 1991

[30] Foreign Application Priority Data

Oct. 1, 1990 [JP] Japan .................................. 2-263511

[51] Int. Cl.$^5$ .............................................. G01D 15/16

[52] U.S. Cl. ...................................................... 347/29

[58] Field of Search ............................ 346/140 R, 1.1

[56] References Cited

U.S. PATENT DOCUMENTS

| | | | |
|---|---|---|---|
| 4,410,900 | 10/1983 | Terasawa | 346/140 R |
| 4,506,277 | 3/1985 | Terasawa | 346/140 R |
| 4,999,643 | 3/1991 | Terasawa | 346/140 R X |
| 5,086,305 | 2/1992 | Terasawa | 346/140 R X |
| 5,140,344 | 8/1992 | Tsukada et al. | 346/140 R X |
| 5,142,308 | 8/1992 | Hasegawa et al. | 346/140 R |

*Primary Examiner*—A. T. Grimley

*Assistant Examiner*—Sandra L. Brase

*Attorney, Agent, or Firm*—Harper & Scinto

[57] ABSTRACT

An ink jet recording apparatus includes a recording head having an ink discharge opening for discharging ink, a suction system for applying negative pressure to the ink discharge opening to suck ink therefrom to recover proper discharge of ink, and a first capping member for capping the ink discharge opening, the member being connected to the suction system to apply negative pressure to the discharge opening when it is capped. The apparatus also includes an ink retaining portion for retaining ink to be fed to the recording head, a vent opening in the ink retaining portion, and a second capping member for capping the vent opening. The capping members are operable in a first mode in which the first capping member does not cap the discharge opening and the second capping member does not cap the vent opening, a second mode in which the first capping member caps the ink discharge opening and the second capping member does not cap the vent opening, and a third mode in which the first capping member caps the ink discharge opening and the second capping member caps the vent opening.

43 Claims, 7 Drawing Sheets

SUCTION RECOVERY MECHANISM AND INK JET RECORDING APPARATUS USING SAME

BACKGROUND OF THE INVENTION

1. Field of the Invention

The present invention relates to a suction recovery mechanism and an ink jet recording apparatus using the same.

2. Description of the Related Art

Recording apparatuses, such as printers, copying apparatuses and facsimile machines form images on a recording material, such as paper or a plastic thin sheet, on the basis of image information.

Such recording apparatuses are classified according to their recording methods into several types, including an ink jet type, a wire dot type, a thermal type and a laser beam type. Ink jet recording apparatuses operate in such a way that ink is discharged through openings in recording heads onto recording materials so as to perform recording.

An ink jet recording apparatus has the following advantages: it can easily record fine and delicate color images at a high speed by using color inks, and it generates little noise because it employs a non-impact system for recording.

Ink jet recording apparatus is equipped with an ink tank for retaining ink and a recording head through which the ink is discharged to perform recording. A cartridge-type recording head, in which an ink tank and recording head are formed integrally, is widely employed as a replaceable recording head.

When such a type of ink jet recording apparatus is not performing a recording operation, the recording head is tightly closed, or capped, so that the ink in a discharge opening does not dry out. Consequently, the opening is prevented from clogging.

An air communicating or vent opening is formed in the ink tank to keep pressure inside the tank constant while the recording apparatus is performing a recording operation. When the apparatus is not performing a recording operation, the vent opening must also be capped to prevent the ink from evaporating.

The structure of a conventional ink jet recording apparatus is such that when the recording head discharge opening is capped, the ink tank vent opening is simultaneously capped.

In such a structure, however, when the ink increases in viscosity or adheres to the discharge opening, thus clogging the opening, it is impossible or difficult to suck ink through the discharge opening to recover a proper recording condition because negative pressure is generated in the ink tank.

SUMMARY OF THE INVENTION

The present invention has been made in view of the above disadvantage. An object of the invention is to provide a simply-constructed suction recovery mechanism and an ink jet recording apparatus using the same which are capable of smoothly recovering the proper discharge condition of a recording head without generating negative pressure in an ink tank, and of effectively preventing ink in the tank from evaporating.

In accordance with one aspect of the present invention, an ink jet recording apparatus comprises a recording head having an ink discharge opening for discharging ink, a suction system for applying negative pressure to the discharge opening to suck ink therefrom to recover proper discharge of ink, a first capping member for capping the discharge opening, the first capping member being connected to the suction system to apply negative pressure to the discharge opening when the discharge opening is capped by the first capping means, an ink retaining portion for retaining ink to be fed to the recording head, a vent opening provided in the ink retaining portion for communicating the interior thereof with the atmosphere, a second capping member for capping the vent opening, and operating means for operating the first and second capping members in a first mode in which the first capping member does not cap the ink discharge opening and the second capping member does not cap the opening, a second mode in which the first capping member caps the ink discharge opening and the second capping member does not cap the vent opening, and a third mode in which the first capping member caps the discharge opening and the second capping member caps the vent opening.

In accordance with yet another aspect of the invention, operating means causes the first capping member to cap the discharge opening and causes the second capping member not to cap the vent opening.

In accordance with a still further aspect of the present invention, operating means operates the first and second capping members so that the application of negative pressure to the discharge opening causes no negative pressure in the ink retaining portion.

DESCRIPTION OF THE PREFERRED EMBODIMENTS

The preferred embodiments of the present invention will be described in detail with reference to the drawings.

Figure 8:
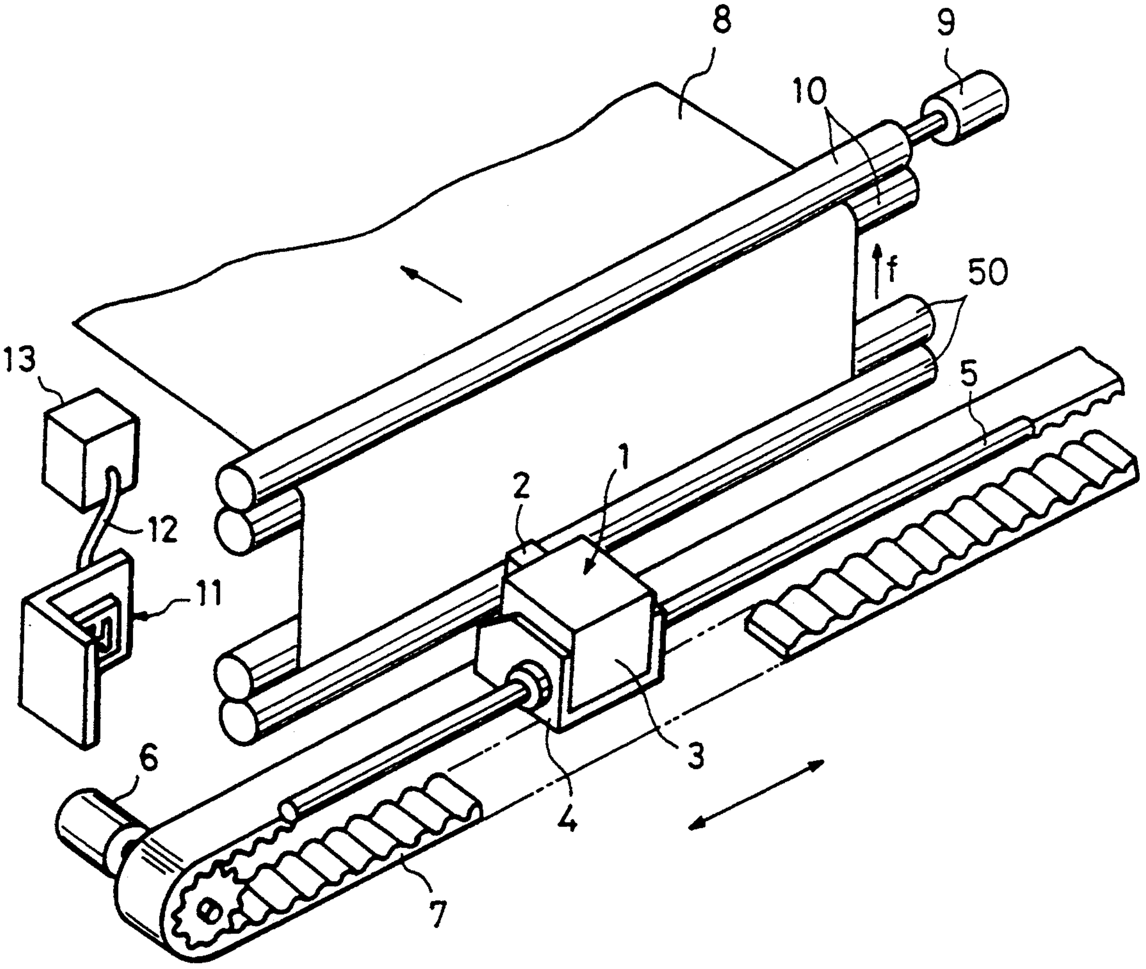
FIG. 8 is a perspective view showing an embodiment of the ink jet recording apparatus in accordance with the invention.

FIG. 8 is a perspective view schematically showing an embodiment of the ink jet recording apparatus in accordance with the invention. A head cartridge 1 including a serial type recording head 2 and an ink tank or ink retaining portion 3 is mounted on a carriage 4, which is operated by a carriage motor 6 to move back and forth along a guide rail 5 with the aid of a timing belt 7.

A sheet-like recording material 8, made of paper or a thin plastic sheet, is carried or fed by a pair of feed rollers 10 and a pair of supporting rollers 50 along a predetermined path in a direction indicated by arrow f at predetermined timing and pitch. The feed rollers 10 are driven by a paper feeding motor 9, and the supporting rollers 50 cooperate with the feed rollers 10.

When the recording material 8 is held in a recording position where it faces the recording head 2, the recording head 2 performs recording as the carriage moves it relative to the recording material 8. After the recording head 2 has completed a recording scan of one line, the recording material 8 is fed for the next recording scan in an amount equal to a recording width.

In most cases, the head cartridge 1, composed of the recording head 2 and the ink tank 3, is mounted on the carriage 4 so that it may be replaced. However, in some cases, it may be integrally formed with the carriage 4. The recording head 2 and the ink tank 3 may be made from different members.

A capping means 11 for tightly closing or capping a discharge opening in the recording head 2 is disposed in a position inside the region within which the carriage 4 moves, but outside the region where recording is performed.

The capping means 11 caps the discharge opening of the recording head 2 to prevent the ink in the recording head from drying, thus keeping the ink from hardening and increasing in viscosity and thereby maintaining a normal discharge condition.

An operating means 11 includes a capping member connected to a suction pump 13 via a tube 12, which together comprise a suction system. If a discharge failure occurs, such as clogging of the discharge opening, then while the discharge opening is capped, the suction pump 13 sucks ink through the discharge opening so that the proper discharge condition is recovered.

The recording head 2 is a type utilizing thermal energy to discharge ink, and is equipped with an electrothermal converting element. More specifically, it utilizes a pressure change caused by the expansion or contraction of bubbles so as to discharge ink through the discharge opening. The bubbles are formed by film boiling the ink using thermal energy applied by the electrothermal converting element.

Figure 9:
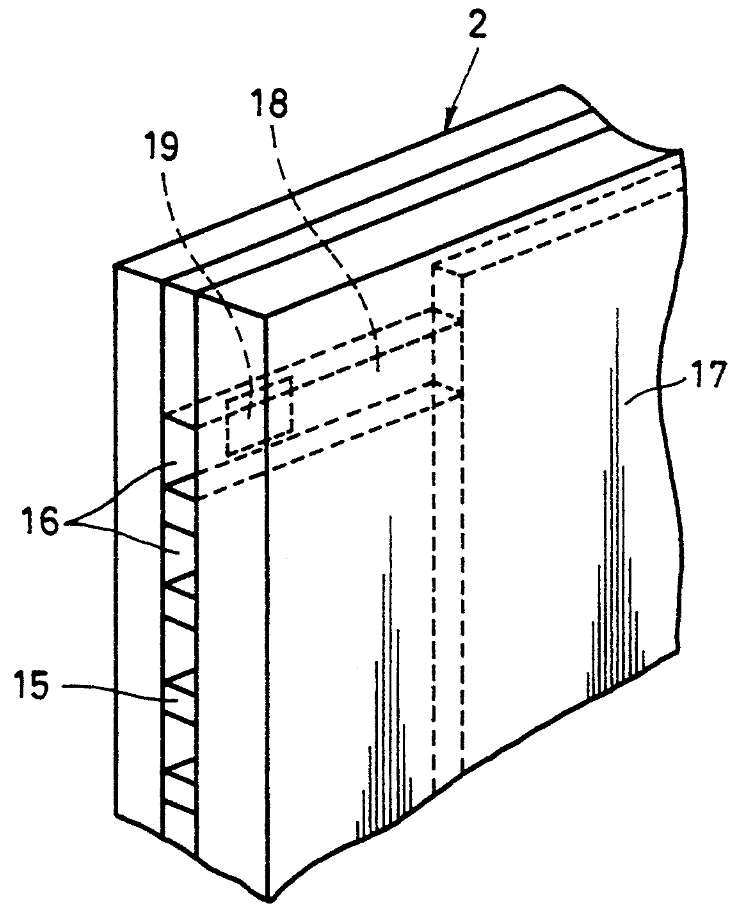
FIG. 9 is a partial perspective view showing schematically an ink discharge portion of the recording head shown in FIG. 8.

FIG. 9 is a partial perspective view schematically showing the structure of the recording head 2.

As shown in the drawing, a plurality of discharge openings 16 are formed at predetermined intervals on a discharge surface 15 of the recording head 2 which faces the recording material 8 at a predetermined distance of, for example, about 0.5–2.0 mm. An electrothermal converting element 19, such as a resistance heating element, for generating energy to discharge the ink, is disposed on the wall of a liquid path 18 connecting each discharge opening 16 to a common liquid chamber 17.

In this embodiment, the recording head 2 is mounted on the carriage 4 so that the discharge openings 16 are arranged in a direction perpendicular to the direction in which the carriage 4 performs scanning.

The recording head 2 operates in the following way. The electrothermal converting element 19 is energized by application of an electric current in accordance with an image or discharge signal to cause film boiling of the ink inside the liquid path 18. Pressure generated at this stage discharges the ink through the discharge opening 16.

FIRST EMBODIMENT

Figure 1:
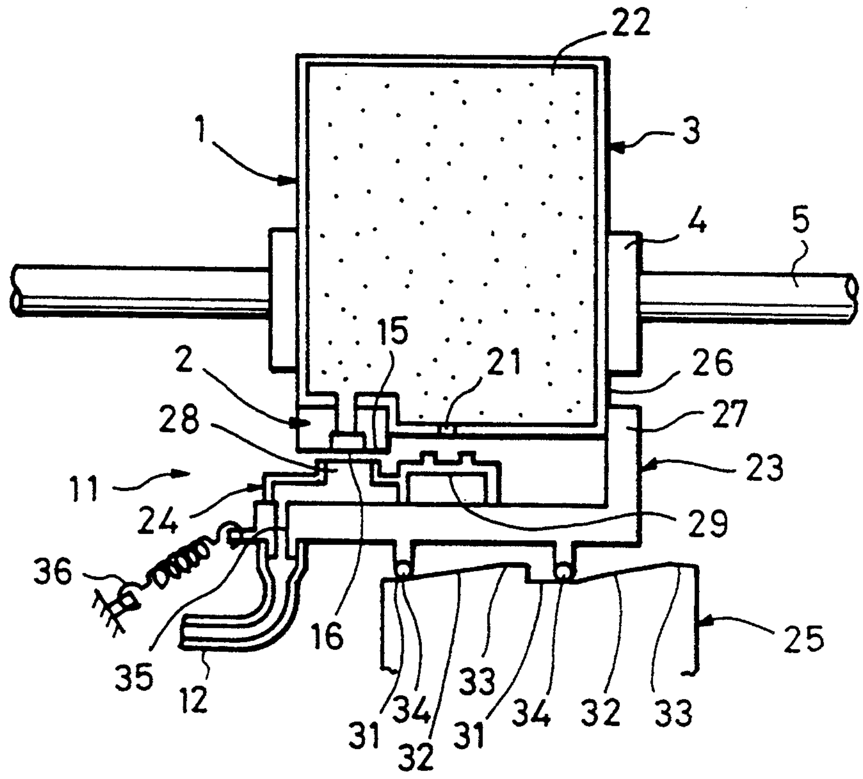
FIG. 1 is a schematic view showing the structure and operation of a recording head, an ink tank and capping means of an ink jet recording apparatus before the head is capped in an embodiment of the present invention.
Figure 2:
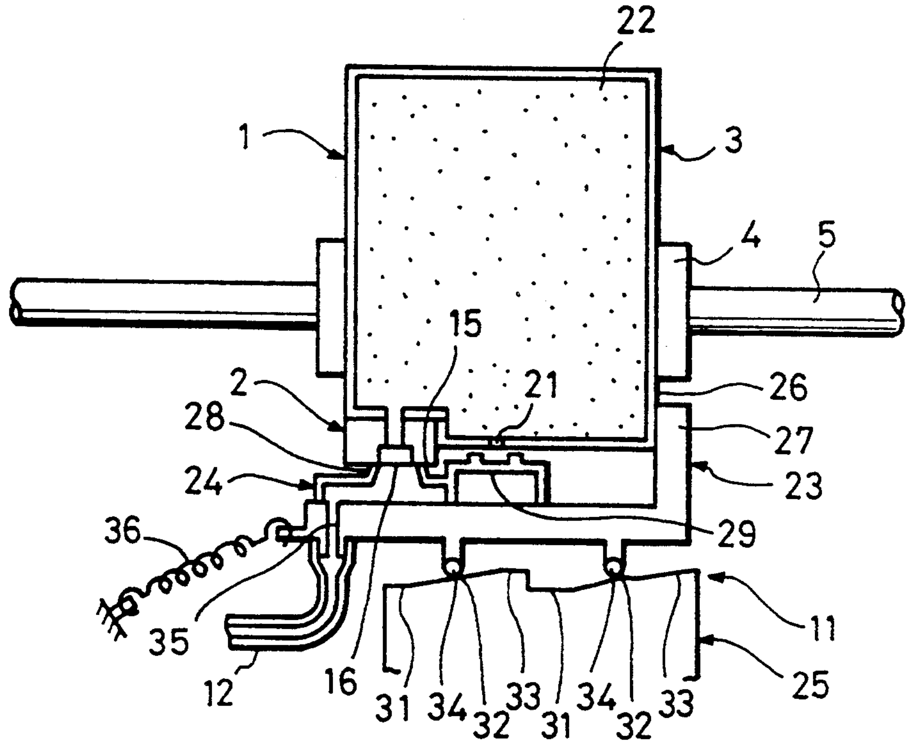
FIG. 2 is a schematic cross-sectional view where only a discharge opening, shown in FIG. 1, is capped.
Figure 3:
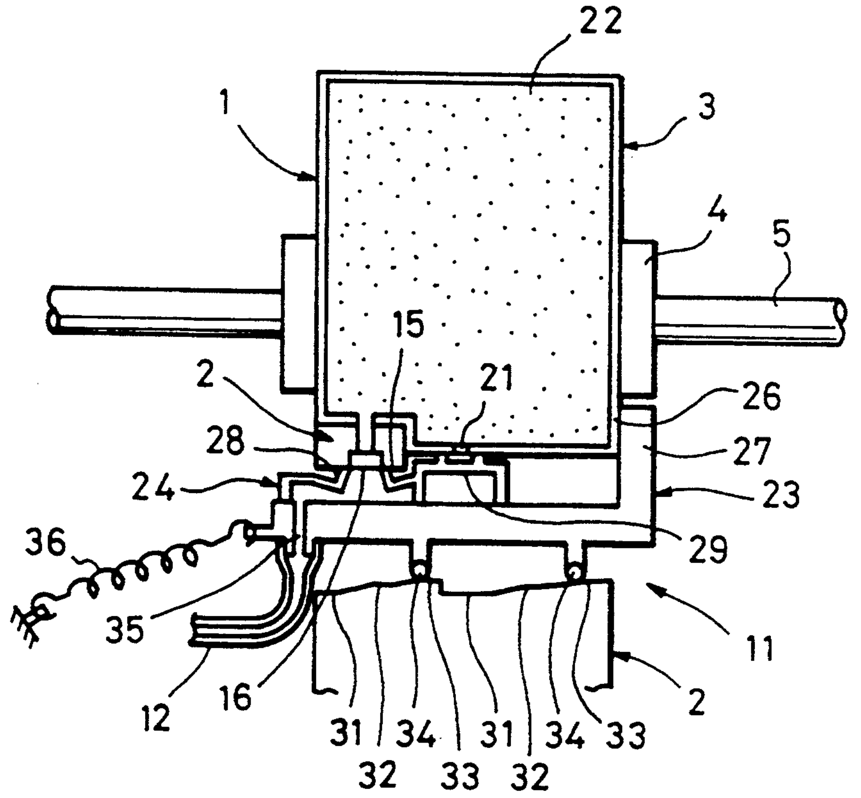
FIG. 3 is a schematic cross-sectional view where the discharge opening and a vent opening, shown in FIG. 1, are both capped.

FIGS. 1 to 3 are horizontal sectional views showing the structure and operation of the head cartridge 1 and the capping means 11 in accordance with the first embodiment in which the advantages of the present invention can be obtained.

As shown in these drawings, the discharge openings 16 are formed in the front of the recording head 2, and an air communicating or vent opening 21 is formed in the front of the ink tank 3.

The ink tank 3 is filled with a porous ink absorbing member 22 to retain the ink contained in the ink tank.

The operating means 11, includes a cap mounting member 23, cap means 24, and a cam 25, and is disposed in a predetermined position inside the region within which the carriage 4 moves, but outside the region where recording is performed.

An engaging portion 27 is formed on the cap mounting member 23, which engaging portion 27 comes into contact with a side 26 of the ink tank 3 when the carriage 4 moves to a capping position.

The cap means 24, made of a rubber-like elastic sealing material, includes a first capping member 28 for capping the discharge opening 16 of the recording head 2 and a second capping member 29 for capping the vent opening 21 of the ink tank.

In the embodiment shown in FIGS. 1 to 3, the first and second capping members 28 and 29 are formed integrally as a single elastic cap means 24, but these capping members may also be formed separately.

The cam 25 is disposed at the back of the cap mounting member 23. The surface of the cam 25 is shaped into cam surfaces 31, 32 and 33 so as to restrict the front and back positions of the cap mounting member 23. Two rollers 24 capable of rolling or sliding on the cam surfaces 31, 32 and 33 are provided at the back of the member 23.

A penetrating hole 35 communicating with the inside of the first capping member 28 is formed in the mounting member 23, and is connected to the recovery suction pump 13 through the tube 12 (see FIG. 8).

The cap mounting member 23 is energized by a spring 36 at the left-hand side of the drawings. When the carriage 4 is not in the capping position, as, for example, during recording, the mounting member 23 is held in a withdrawal position where the rollers 34 are in contact with the cam surfaces 31.

With reference to FIGS. 1 to 3, the operation of this embodiment will now be described.

To perform recording, the recording head 2 is operated to form images on the recording material 8 while the carriage 4 is moved back and forth along the guide rail 5 in a region to the left of the position of the carriage 4 shown in FIG. 1.

At this stage, the rollers 34 rest on the cam surfaces 31; the cap mounting member 23 is in the withdrawal position; and the discharge opening 16 and the vent opening 21 are both open. This represents the first mode of operation of the capping members.

To recover a discharge condition of the recording head 2, the carriage 4 is moved from its position shown in FIG. 1 to the position shown in FIG. 2.

At this stage, the side of the ink tank 3 mounted on the carriage 4 is in contact with the engaging portion 27;

consequently, the cap mounting member 23 is moved together with the carriage 4. The rollers 34 roll onto the cam surfaces 32.

For this reason, the cap mounting member 23 moves forward toward the discharge surface a fixed distance. The first capping member 28, made of a rubber-like elastic material, is pressed into contact with the discharge surface 15 of the recording head 2, whereby the discharge opening 16 is capped.

The suction pump 13 (see FIG. 8) sucks the ink in the discharge opening 16 through the tube 12 to recover the proper discharge condition.

In a discharge recovery state, shown in FIG. 2, the second capping member 29 is not yet pressed into contact with a portion around the vent opening 21, and the opening 21 is accordingly not yet capped. This represents a second mode of operation of the first and second capping members.

It is therefore possible to recover the proper discharge condition without generating negative pressure inside the ink tank 3.

When neither the recording operation nor the recovering operation is performed, the carriage 4 is moved from its position shown in FIG. 2 to the right of the drawing, and likewise the cap mounting member 23 in contact with the ink tank 3 is moved to the right, to the position shown in FIG. 3.

In a state shown in FIG. 3, the rollers 34 roll onto the cam surfaces 33 which are higher than the other cam surfaces 31 and 32.

For the above reason, the cap mounting member 23 moves further forward a fixed distance. The first capping member 28, made of a rubber-like elastic material, is pressed into more firm contact with the discharge surface 15, while at the same time the second capping member 29, made of a rubber-like elastic material, is pressed into contact with a portion around the vent opening 21.

In the state shown in FIG. 3, the first capping member 28 is further pressed into contact with the discharge surface 15, thus deforming the capping member 28. The discharge opening 16, however, remains capped, as shown in FIG. 3.

Thus, the discharge opening 16 as well as the vent opening 21 remain capped. This represents a third mode of operation of the capping members 28 and 29.

To perform image recording or the like, when the carriage 4 is moved to the left of the drawing, the cap mounting 23 retracts as it is returned by the spring 36 to the position shown in FIG. 1.

In the embodiment shown in the drawings, though the cap mounting member 23 is moved by bringing it into contact with the ink tank 3 on the carriage 4, it may also be moved by bringing it into contact with the carriage 4 itself or any component which moves together with the carriage 4.

As described above with reference to FIGS. 1 to 3, when the discharge opening 16 and the vent opening 21 are formed in a surface facing the same direction, a single cap means 24 is capable of capping these openings 16 and 21. The structure of the cap means 24 is rendered simple because separate components are not required to cap the two openings 16 and 21.

SECOND EMBODIMENT

Figure 4:
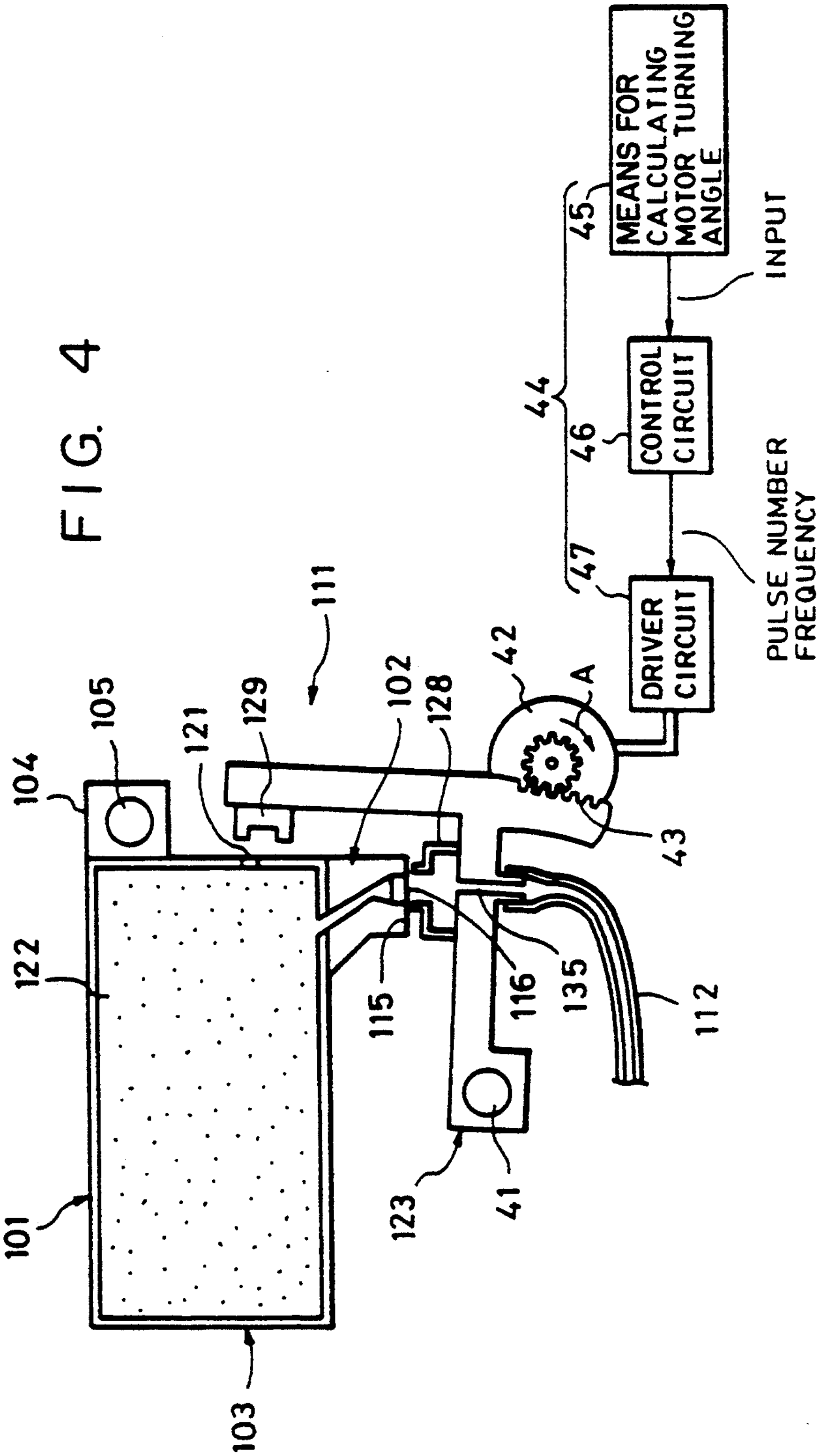
FIG. 4 is a schematic view showing the structure and operation of a recording head, an ink tank and capping means of an ink jet recording apparatus before the head is capped in another embodiment of the invention.
Figure 5:
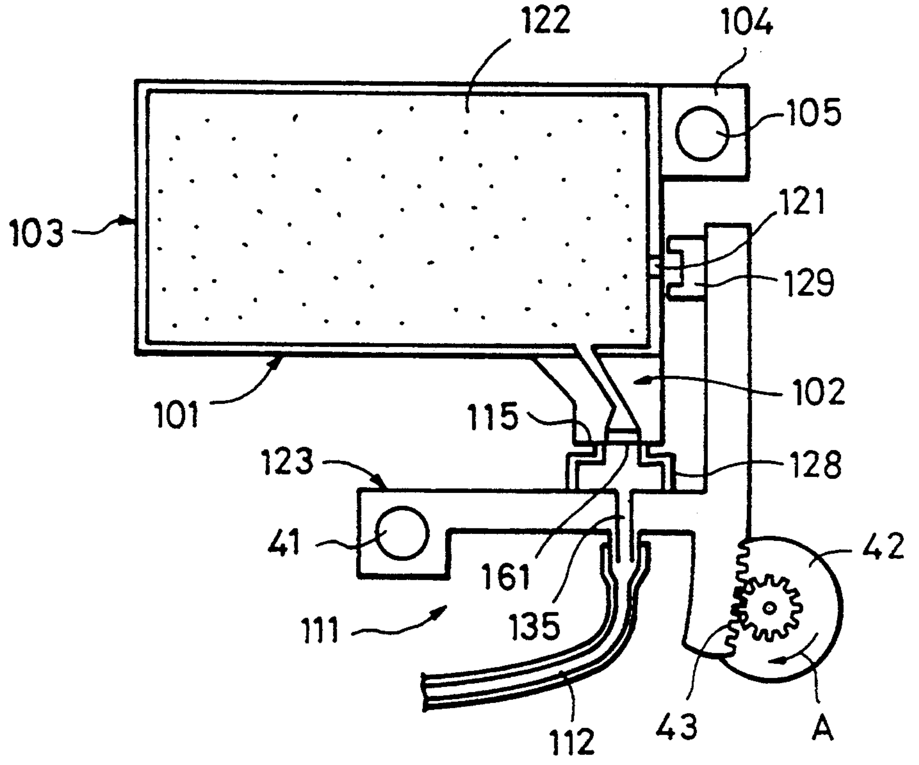
FIG. 5 is a schematic cross-sectional view where only a discharge opening, shown in FIG. 4, is capped.
Figure 6:
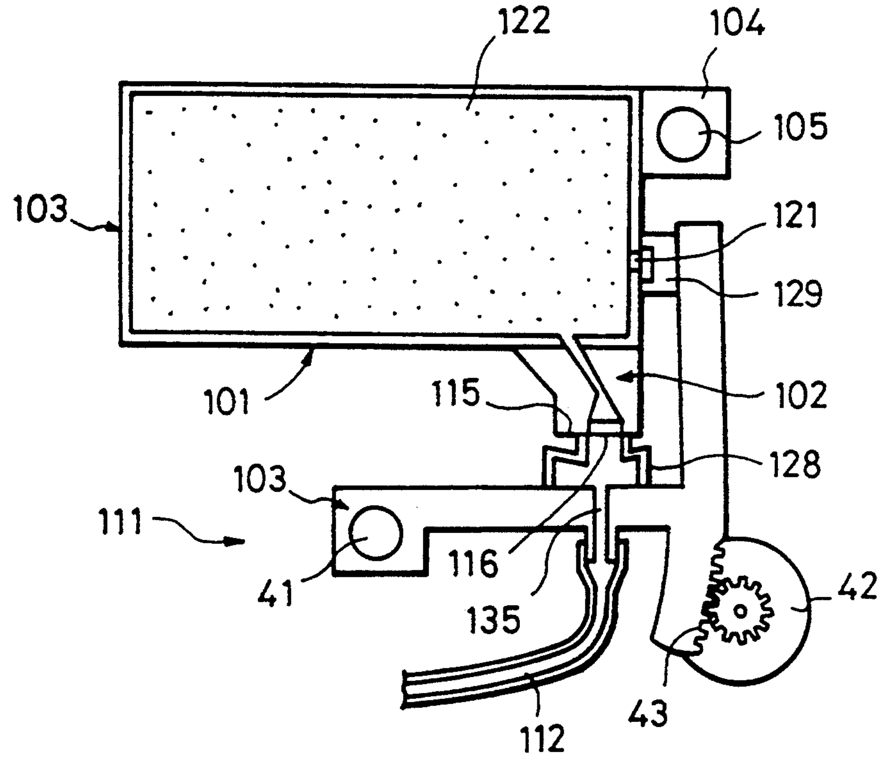
FIG. 6 is a schematic cross-sectional view where the discharge opening and a vent opening, shown in FIG. 4, are both capped.

FIGS. 4 to 6 are sectional side views showing the structure and operation of a head cartridge 101 and operating means 111 in another embodiment in which the advantages of the present invention can be obtained.

As shown in these drawings, the head cartridge 101 is constructed in such a manner that a recording head 102 is secured to the undersurface of an ink tank or ink retaining portion 103. The head cartridge 101 is constructed integrally with a carriage 104.

The carriage motor 6 (see FIG. 8) moves the carriage 104 back and forth along a guide rail 105.

A discharge opening 116 is formed in the undersurface of the recording head 102, and an air communicating or vent opening 121 is formed in a side of the ink tank 103.

In this embodiment, in other words, the discharge and the vent openings 116 and 121 are each formed in a different surface, separated by an angle of substantially 90°, each of which surfaces faces a different direction.

The ink tank 103 is filled with a porous ink absorbing member 122 which retains the ink contained in the ink tank.

The operating means 111 is disposed in a predetermined position inside the region within which the carriage 104 moves, but outside the region where recording is performed.

The structure of the operating means 111 is such that a first capping member 128 and a second capping member 129 are affixed to a mounting member 123 capable of swinging around a shaft 41, and a pulse motor 42 controls the angle through which the mounting member 123 swings.

The first capping member 128 caps the discharge opening 116 of the recording head 102, and the second capping member 129 caps the vent opening 121 of the ink tank 103, both of the capping members 128 and 129 being made of a rubber-like elastic sealing material.

A penetrating hole 135 communicating with the inside of the first capping member 128 is formed in the mounting member 123, and is connected to the suction pump 13 through the tube 12 (see FIG. 8).

A gear transmitting mechanism 43 is provided between the pulse motor 42 and the mounting member 123. The angle through which the motor 42 rotates is controlled, and thereby the angle through which the mounting member 123 swings can be controlled with the aid of the gear transmitting mechanism 43.

A control system 44 has a control circuit 46, a driver circuit 47 and means 45 for calculating motor rotation angles, and it controls the pulse motor 42 as shown schematically in FIG. 4. On the basis of the motor rotation angles, the control system 44 calculates the number of pulses required for the motor 42 to rotate from its current angle to a preset rotation angle, thus driving the pulse motor 42 through the resultant pulse number frequency.

With reference to FIGS. 4 to 6, the operation of this embodiment will now be described.

To perform recording, while the carriage 104 is moved back and forth along the guide rail 105 within the recording region, the recording head 102 forms images on the recording material 8.

During recording, the mounting member 123 is held in the position shown in FIG. 4.

When recording is not performed the carriage 104 is moved to a position where it faces the operating means 111 disposed outside the recording region.

To recover the proper discharge condition, the pulse motor 42 is rotated in a direction indicated by arrow A, thus causing the mounting member 123 to swing counterclockwise around the shaft 41 to the position shown in FIG. 5.

In a state illustrated in FIG. 5, the first capping member 128 is pressed into contact with a discharge surface 115 of the recording head 102, whereby the discharge opening 116 is capped.

In the above discharge recovery state, the second capping member 129 is not yet pressed into contact with a portion around the vent opening 121; consequently, the opening 121 is not yet capped.

The suction pump 13 (see FIG. 8) sucks the ink in the discharge opening 116 through the tube 112 to recover the proper discharge condition.

In such a case, because the vent opening 121 remains open, it is possible to recover the discharge condition without generating negative pressure inside the ink tank 103.

When neither a recording operation nor discharge recovery operation is performed, the pulse motor 42 is further rotated in the direction indicated by arrow A, thus causing the mounting member 123 to swing around the shaft 41 to the position shown in FIG. 6.

In the state shown in FIG. 6, the first capping member 128, made of a rubber-like elastic material, is pressed into more firm contact with the discharge surface 115, while at the same time the second capping member 129, also made of a rubber-like elastic material, is pressed into contact with the portion around the vent opening 121.

The first capping member 128 is further pressed into contact with the discharge surface 115, thus deforming the capping member 128. The discharge opening 116, however, remains capped, as shown in FIG. 6.

Thus, the discharge opening 116 as well as the vent opening 121 remain capped.

To resume recording, the pulse motor 42 is rotated in a direction opposite to that indicated by arrow A, thereby causing the mounting member 123 to swing back to the position shown in FIG. 4. The carriage 104 is then moved to perform image recording or the like.

To recover the proper discharge condition, without immediately resuming recording it is sufficient to rotate the pulse motor 42 in a direction opposite to that indicated by arrow A only to the position shown in FIG. 5.

The second embodiment, shown in FIGS. 4 to 6, is applied to the structure where the discharge opening 116 and the vent opening 121 are each bored in a different surface, both of which form an angle of substantially 90° therebetween. The second embodiment, however, may also be applied to the structure where the discharge opening 116 and the vent opening 121 are bored in two different surfaces which do not form an angle of 90° between the surfaces. In both cases, advantageous effects of the present invention are equally obtainable.

In accordance with the second embodiment described with reference to FIGS. 4 to 6, even when the discharge opening 116 and the vent opening 121 are each formed in a different surface, each of which faces a different direction, a single motor 42 is capable of capping both of these openings 116 and 121.

Figure 7:
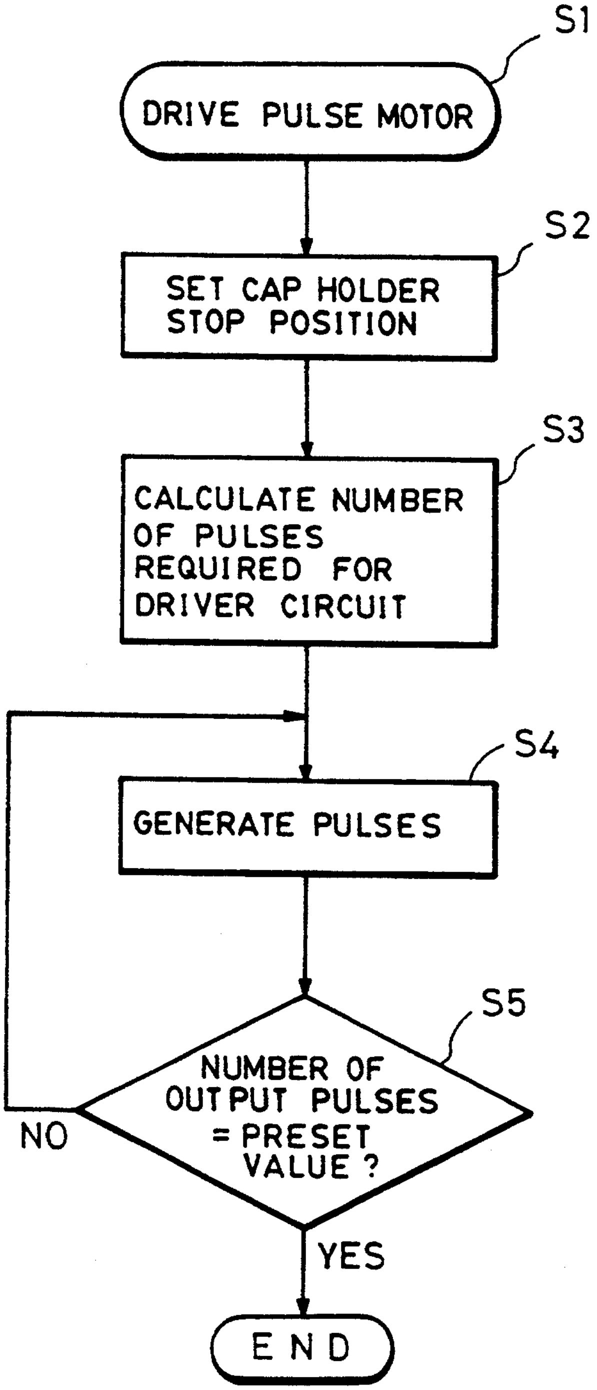
FIG. 7 is a flowchart showing the operation of controlling the capping means shown in FIGS. 1 to 6.

FIG. 7 is a flowchart showing a sequence for use in the control of a capping operation described in the above embodiment.

In step S1 if a command is issued for driving the driving source (motor 6 or 42), the stop position of the mounting member 23 or 123 is set in step S2.

In the first embodiment, shown in FIGS. 1 to 3, the driving source or means is the carriage motor 6 (typically a stepping motor); in the second embodiment, shown in FIGS. 4 to 6, the driving source or means, also typically a stepping motor, is the motor 42, which swings the mounting member 123.

In the first embodiment, setting mounting member stop position refers to a value that represents the position of the carriage 4 in either the position shown in FIG. 2 or that shown in FIG. 3. In the second embodiment, similarly, setting the mounting member stop position refers to the position of the member 123 in either the position shown in FIG. 5 or that shown in FIG. 6.

After the mounting member stop position has been set, in step S3 the number of pulses of the driver circuit required for the carriage motor 6 (used in the first embodiment) or the stepping motor 42 (used in the second embodiment) is calculated to move the mounting member 23 or 123 from its current position to the stop position which has been previously set.

In step S4 the number of pulses calculated in step S3 is generated to drive the motor 6 or 42. In step S5 a determination is made as to whether the number of output pulses has reached a preset value used for setting the mounting member stop position.

In step S5 when the number of output pulses reaches the preset value, the operation of either the carriage motor 6 or the stepping motor 42 is stopped.

Thus, in the first embodiment, when the carriage 4 is moved to its stop position, the capping operation is controlled, and in the second embodiment, when the cap holder 123 is swung to its stop position, the capping operation is controlled.

The first embodiment described above provides two arrangements: one in which only the discharge opening 16 of the recording head 12 is capped, and the other in which both the discharge opening 16 and the vent opening 21 of the ink tank 13 are capped. Similarly, the second embodiment provides two arrangements: one in which only the discharge opening 106 of the recording head 102 is capped, and the other in which both the discharge opening 106 and the vent opening 121 of the ink tank 103 are capped. It is therefore possible to provide an ink jet recording apparatus capable of preventing negative pressure from being generated in the ink tank 3 or 103, so that the proper discharge condition is smoothly recovered, and preventing the ink from evaporating through the discharge opening 16 or 116 and through the vent opening 21 or 121.

The first and second embodiments have been described where the present invention is applied to a serial-type ink jet recording apparatus that employs the serial type recording head 2 or 102 mounted on the carriage 4 or 104 moving along the recording material 8. This invention, however, is equally applicable to a line-type ink jet recording apparatus that employs a line type recording head covering a part or whole of the recording region of paper. In both cases, the advantages of the invention are equally obtainable.

The above embodiments have also been explained where the invention is applied to a type of ink jet recording apparatus employing one recording head 2 or 102. However, regardless of the number of recording heads, the invention provides the same advantages and is equally applicable to other types of ink jet recording apparatuses, such as those employing a plurality of recording heads for recording with different colors, and those employing a plurality of recording heads for recording with different hues of the same color.

In the above embodiments, the invention is applied to an ink jet recording apparatus having a cartridge-type recording head with which the recording head 2 or 102 and the ink tank 3 or 103 are constructed integrally. The invention may also be applied to an ink jet recording apparatus of a type in which a recording head and an ink tank are separately constructed and are joined together through, for example, a coupler or a tube. In both cases, the present invention is capable of providing the same advantages.

The invention is also applicable to recording apparatuses, so long as these apparatuses are ink jet recording apparatuses, such as those having a recording head which uses an electro-mechanical converting element like a piezo element. The present invention provides excellent advantages when it is applied to all such apparatuses, but particularly when applied to ink jet system recording heads and apparatuses in which thermal energy is utilized to form liquid droplets, which is ejected through an ejection outlet, for recording. This is because the high density of the picture element, and the high resolution of the recording are possible.

The typical structure and the operational principle of the ink jet system are disclosed in, for example, U.S. Pat. Nos. 4,723,129 and 4,740,796. (Those are the other patent documents discussed below are incorporated herein by reference.)

The ink jet system is applicable to both a continuous type and a so-called on-demand type recording apparatus. It is effective in recording, especially in the case of an on-demand type apparatus because at least one driving signal is applied to an electrothermal converting element disposed in a position corresponding to a liquid (ink)retaining sheet or a liquid path. The driving signal corresponds to recording information and quickly increases the temperature of the liquid to above the temperature required for nucleate boiling. Such an application of the driving signal causes the electrothermal converting element to generate thermal energy, thereby providing film boiling on the heating surface of the electrothermal recording element. As a result, bubbles of ink vapor are formed in response to the driving signals.

The expansion and contraction of the bubbles discharge the ink through the discharge opening to produce at least one droplet.

When the driving signals are applied as pulses, the bubbles can be immediately and appropriately expanded and contracted. The ink can thus be discharged in response to those pulses. The driving signals disclosed in U.S. Pat. Nos. 4,463,359 and 4,345,262 are preferably used as such pulse-formed driving signals.

When this invention employs the technique, disclosed in U.S. Pat. No. 4,313,124, regarding the ratio at which the temperature increases on the heating surface mentioned above, it is capable of recording more effectively.

In addition to the linear liquid path or right-angled liquid path disclosed in each of the above U.S. Patents, the present invention is applicable to the structure of a recording head disclosed in U.S. Pat. Nos. 4,558,333 or 4,459,600, in which a heating portion is disposed in a bent portion.

This invention is also effective in recording when it is applied to the structure such as that, disclosed in Japanese Patent Laid-Open No. 59-123,670, in which a slit, commonly used by a plurality of electrothermal converting elements, serves as the discharge portion of the converting elements, or to a head structure such as that disclosed in Japanese Patent Laid-Open No. 59-138,461, in which an opening for absorbing the pressure wave of thermal energy corresponds to a discharge portion.

In other words, this invention is capable of effective and reliable recording, regardless of the structure of the recording head.

The present invention is also applicable to a full-line type recording head which has a length corresponding to the maximum width of a recording medium.

Such a full-line type recording head may include either a single recording head or a plurality of recording heads which are combined to cover the maximum width.

Alternatively, the present invention is applicable to a recording head secured to the ink jet recording apparatus; to a cartridge-type recording head having an ink tank formed integrally with this recording head; or to a replaceable chip-type recording head in which, because the head is mounted on the ink jet recording apparatus, it can be electrically connected to the recording apparatus and ink can be supplied from the recording apparatus.

This invention is more effective in recording when other structure, such as additional recovery means and preliminary or auxiliary discharge means, are used with it. These means are used for the recording head, and can form a part of the structure of the recording apparatus. More specifically, cleaning means, pressing means and preliminary heating means, including the electrothermal converting element, a heating element or a combination of both, may be provided in the recording head. The additional provision of a preliminary discharge mode helps to perform smooth recording.

The number of mountable recording heads varies according to the type of ink: for instance, only one recording head is mounted for monochromatic ink, whereas a plurality of recording heads are mounted for a plurality of inks having different colors and hues.

The present invention is also very effective in recording when it is applied to an ink jet recording apparatus which has either an integral recording head or a plurality of recording heads combined together. The integral recording head is used in a recording mode for one main color such as black, while a plurality of recording heads are used in a recording mode for different colors or a full range of colors.

In the embodiments of this invention described above, ink in the form of liquid has been utilized, but ink in other forms may also be utilized, such as those solidified at or below room temperature, or those softened or liquefied at room temperature. In an ink jet system, ink that is liquefied when a recording signal is applied may also be utilized because, typically, the temperature of the ink is controlled so that it stays within a range of not less than 30° C. and not more than 70° C. and so that the viscosity of the ink remains stable for discharge purposes.

A temperature rise caused by thermal energy is frequently used as energy for converting solid ink to liquid ink so that the temperature is prevented from rising. To prevent the ink from evaporating, a type of ink may be employed which solidifies when left unused. Another type of ink may be employed which is liquefied when the thermal energy, in response to the recording signal, is applied. Alternatively, a type of ink may be employed, such as that which starts to solidify by the time the ink reaches a recording medium, but is not liquefied until the thermal energy is applied. The present invention may be applied to any type of ink mentioned above.

In this invention, the most effective discharge system is the film boiling system mentioned above.

The ink jet recording apparatus of the invention may be used as the output terminal of an information processing apparatus such as a computer, a copying apparatus combined with an image reader and the like, or as a facsimile machine having an information sending and receiving function.

As has been described above, the present invention provides a simply-constructed discharge recovery suction mechanism and an ink jet recording apparatus using the same which are capable of smoothly recovering a proper discharge condition of a recording head without generating negative pressure in an ink tank, and of effectively preventing ink in the tank from evaporating.

What is claimed is:

1. An ink jet recording apparatus for recording using a recording head for discharging ink from an ink discharge opening, said ink jet recording apparatus comprising:

- a holding member for holding an ink jet recording head having an ink discharge opening for discharging ink;
- a suction system for applying negative pressure to said discharge opening to suck ink therefrom to recover proper discharge of ink;
- a first capping member for capping said discharge opening, said first capping member being connected to said suction system to apply negative pressure to said discharge opening when said discharge opening is capped by said first capping member;
- an ink retaining portion for retaining ink to be fed to said recording head;
- a vent opening provided in said ink retaining portion for communicating the interior thereof with the atmosphere;
- a second capping member for capping said vent opening; and
- operating means for operating said first and second capping members in a first mode in which said first capping member does not cap said ink discharge opening and said second capping member does not cap said vent opening, a second mode in which said first capping member caps said ink discharge opening and said second capping member does not cap said vent opening, and a third mode in which said first capping member caps said discharge opening and said second capping member caps said vent opening.

2. An ink jet recording apparatus according to claim 1, wherein a member in which said first and second capping members are provided is moved on an uneven surface so as to change the distance between said first capping member and said discharge opening and the distance between said second capping member and said vent opening so that said first capping member caps said discharge opening and said second capping member caps said vent opening.

3. In ink jet recording apparatus according to claim 1, wherein a member in which said first and second capping members are provided is swung around surfaces in which said discharge opening and said vent opening are formed so as to change the distance between said first capping member and said discharge opening and the distance between said second capping member and said vent opening so that said first capping member caps said discharge opening and said second capping member caps said vent opening.

4. An ink jet recording apparatus according to claim 1, wherein said first and second capping members are formed of the same elastic member.

5. An ink jet recording apparatus according to claim 1, wherein said recording head is a serial type moving on a carriage.

6. An ink jet recording apparatus according to claim 1, wherein said recording head is a line type having a width corresponding to a part or whole of a recording region of a recording material.

7. An ink jet recording apparatus according to claim 1, wherein said ink retaining portion is a cartridge type formed integrally with said recording head.

8. An ink jet recording apparatus according to claim 1, wherein said recording head is equipped with an electrothermal converting element, used as an energy generating element, for generating energy to discharge the ink.

9. An ink jet recording apparatus according to claim 8, wherein said recording head discharges the ink through said discharge opening in such a manner that a bubble is developed by boiling a film with thermal energy applied by said electrothermal converting element.

10. An ink jet recording apparatus for recording using a recording head for discharging ink from an ink discharge opening, said ink jet recording apparatus comprising:

- a holding member for holding an ink jet recording head having an ink discharge opening for discharging ink;
- a suction system for applying negative pressure to said ink discharge opening to suck ink therefrom to perform a recovery operation;
- a first capping member for capping said ink discharge opening, said first capping member being connected to said suction system for applying negative pressure to said discharge opening;
- an ink retaining portion for retaining ink to be fed to said recording head;
- a vent opening provided in said ink retaining portion for communicating the interior thereof with the atmosphere; and
- a second capping member for capping said vent opening provided in said ink retaining portion,
- wherein said suction system causes said first capping member to cap said ink discharge opening While applying the negative pressure to said discharge opening to perform a recovery operation, and at the same time causes said second capping member not to cap said vent opening.

11. An ink jet recording apparatus according to claim 10, wherein a member in which said first and second capping members are provided is moved on an uneven surface so as to change the distance between said first capping member and said discharge opening and the distance between said second capping member and said vent opening so that said first capping member caps said discharge opening and said second capping member caps said vent opening.

12. An ink jet recording apparatus according to claim 10, wherein a member in which said first and second capping members are provided is swung around surfaces in which said discharge opening and said vent opening are formed so as to change the distance between said first capping member and said discharge opening and the distance between said second capping member and said vent opening so that said first capping member caps said discharge opening and said second capping member caps said vent opening.

13. An ink jet recording apparatus according to claim 10, wherein said first and second capping members are formed of the same elastic member.

14. An ink jet recording apparatus according to claim 10, wherein said recording head is a serial type moving on a carriage.

15. An ink jet recording apparatus according to claim 10, wherein said recording head is a line type having a width corresponding to a part or whole of a recording region of a recording material.

16. An ink jet recording apparatus according to claim 10, wherein said ink retaining portion is a cartridge type formed integrally with said recording head.

17. An ink jet recording apparatus according to claim 10, wherein said recording head is equipped with an electrothermal converting element, used as an energy generating element, for generating energy to discharge the ink.

18. An ink jet recording apparatus according to claim 17, wherein said recording head discharges the ink through said discharge opening in such a manner that a bubble is developed by boiling a film with thermal energy applied by said electrothermal converting element.

19. A suction recovery system applicable to an ink jet recording apparatus for recording using a recording head in which ink is discharged through an ink discharge opening to perform recording, said suction recovery system comprising:

- a suction system for applying negative pressure to said ink discharge opening to suck ink therefrom to perform a recovery operation;
- a first capping member for capping said ink discharge opening, said first capping member being connected to said suction system for applying negative pressure to said discharge opening; and
- a second capping member for capping a vent opening provided in an ink retaining portion for containing ink to be fed to said recording head, said vent opening communicating the interior of said ink retaining portion with the atmosphere,
- wherein said suction system causes said first capping member to cap said ink discharge opening while applying the negative pressure to Said discharge opening to perform a recovery operation, and at the same time causes said second capping member not to cap said vent opening.

20. A suction recovery system according to claim 19, wherein a member in which said first and second capping members are provided is moved on an uneven surface so as to change the distance between said first capping member and said discharge opening and the distance between said second capping member and said vent opening so that said first capping member caps said discharge opening and said second capping member caps said vent opening.

21. A suction recovery system according to claim 19, wherein a member in which said first and second capping members are provided is swung around surfaces in which said discharge opening and said vent opening are formed so as to change the distance between said first capping member and said discharge opening and the distance between said second capping member and said vent opening so that said first capping member caps said discharge opening and said second capping member caps said vent opening.

22. A suction recovery system according to claim 19, wherein said first and second capping members are formed of the same elastic member.

23. A suction recovery system according to claim 19, wherein said recording head is a serial type moving on a carriage.

24. A suction recovery system according to claim 19, wherein said recording head is a line type having a width corresponding to a part or whole of a recording region of a recording material.

25. A suction recovery system according to claim 19, wherein said ink retaining portion is a cartridge type formed integrally with said recording head.

26. A suction recovery system according to claim 19, wherein said recording head is equipped with an electrothermal converting element, used as an energy generating element, for generating energy to discharge the ink.

27. A suction recovery system according to claim 26, wherein said recording head discharges the ink through said discharge opening in such a manner that a bubble is developed by boiling a film with thermal energy applied by said electrothermal converting element.

28. An ink jet recording apparatus for recording using a recording head for discharging ink from an ink discharge opening, said ink jet recording apparatus comprising:

- a holding member for holding an ink jet recording head having an ink discharge opening for discharging ink;
- a suction system for applying negative pressure to said ink discharge opening to suck ink therefrom to perform a recovery operation;
- a first capping member for capping said ink discharge opening, said first capping member being connected to said suction system for applying negative pressure to said discharge opening;
- an ink retaining portion for retaining ink to be fed to said recording head;
- a vent opening provided in said ink retaining portion for communicating the interior thereof with the atmosphere; and
- a second capping member for capping said vent opening provided in said ink retaining portion,
- wherein said suction system causes no negative pressure in said ink retaining portion while applying the negative pressure to said discharging opening through said first capping member to perform a recovery operation.

29. An ink jet recording apparatus according to claim 28, wherein a member in which said first and second capping members are provided is moved on an uneven surface so as to change the distance between said first capping member and said discharge opening and the distance between said second capping member and said vent opening so that said first capping member caps said discharge opening and said second capping member caps said vent opening.

30. In ink jet recording apparatus according to claim 28, wherein a member in which said first and second capping members are provided is swung around surfaces in which said discharge opening and said vent opening are formed so as to change the distance between said first capping member and discharge opening and the distance between said second capping member and said vent opening so that said first capping member caps said discharge opening and said second capping member caps said vent opening.

31. An ink jet recording apparatus according to claim 28, wherein said first and second capping members are formed of the same elastic member.

32. An ink jet recording apparatus according to claim 28, wherein said recording head is a serial type moving on a carriage.

33. An ink jet recording apparatus according to claim 28, wherein said recording head is a line type having a width corresponding to a part or whole of a recording region of a recording material.

34. An ink jet recording apparatus according to claim 28, wherein said ink retaining portion is a cartridge type formed integrally with said recording head.

35. An ink jet recording apparatus according to claim 28, wherein said recording head is equipped with an electrothermal converting element, used as an energy generating element, for generating energy to discharge the ink.

36. An ink jet recording apparatus according to claim 35, wherein said recording head discharges the ink through said discharge opening in such a manner that a bubble is developed by boiling a film with thermal energy applied by said electrothermal converting element.

37. A suction recovering method for an ink jet recording apparatus which performs recording using a recording head in which ink is discharged from an ink discharge opening, said method comprising the steps of:

providing a first capping member for capping an ink discharge opening of the recording head during a recovery operation and a second capping member for capping a vent opening that communicates with the atmosphere the interior of an ink retaining portion for retaining ink to be fed to the recording head; and causing the first capping member to cap the discharge opening while applying negative pressure to the first capping member to perform a recovery operation, and at the same time causing the second capping member not to cap the vent opening.

38. A suction recovering method according to claim 37, wherein a member in which the first and second capping members are provided is moved on an uneven surface so as to change the distance between the first capping member and the discharge opening and the distance between the second capping member and the vent opening so that the first capping member caps the discharge opening and the second capping member caps the vent opening.

39. A suction recovering method according to claim 37, wherein a member in which the first and second capping members are provided is swung around surfaces in which the discharge opening and the vent opening are formed so as to change the distance between the first capping member and the discharge opening and the distance between the second capping member and the vent opening so that the first capping member caps the discharge opening and the second capping member caps the vent opening.

40. A suction recovering method according to claim 37, wherein recording is performed by moving a serial type recording head on a carriage.

41. A suction recovering method according to claim 37, wherein recording is performed by holding stationary a line type recording head having a width corresponding to a part or whole of a recording region of a recording material.

42. A suction recovering method according to claim 37, wherein the recording head is equipped with an electrothermal converting element, used as an energy generating element, for generating energy to discharge the ink.

43. A suction recovering method according to claim 42, wherein the recording head discharges the ink through the discharge opening in such a manner that a bubble is developed by boiling a film with thermal energy applied by the electrothermal converting element.

* * * * *

UNITED STATES PATENT AND TRADEMARK OFFICE
CERTIFICATE OF CORRECTION

PATENT NO. : 5,343,228
DATED : August 30, 1994
INVENTOR(S) : HIDEAKI TAKADA

It is certified that error appears in the above-identified patent and that said Letters Patent is hereby corrected as shown below:

ON TITLE PAGE

Under *Attorney, Agent, or Firm*:
"Harper & Scinto" should read --Fitzpatrick, Cella, Harper & Scinto--.

COLUMN 11

Line 62, "In" should read --An--.

COLUMN 12

Line 49, "While" should read --while--.

COLUMN 13

Line 47, "Said" should read --said--.

COLUMN 14

Line 61, "In" should read --An--.

Signed and Sealed this

Twenty-first Day of February, 1995

Attest:

BRUCE LEHMAN

*Attesting Officer*

*Commissioner of Patents and Trademarks*